Patented Nov. 26, 1940

2,223,042

UNITED STATES PATENT OFFICE 2,223,042

METHOD OF MAKING 1,1'-DITHIO BIS ARYLENETHIAZOLES

William E. Messer, Cheshire, Conn., assignor to United States Rubber Company, New York, N. Y., a corporation of New Jersey No Drawing. Application June 22, 1939, Serial No. 280,447

8 Claims. (Cl. 260—306)

This invention relates to a method of making 1,1'-dithio bis arylenethiazoles.

The most prominent member of this class is the disulphide of 1-mercaptobenzothiazole, and therefore the process is illustrated with reference to making it, although the process may be extended to making disulphides of other mercapto arylene thiazoles.

According to the present invention the 1,1'-dithio bis benzothiazole is produced by reacting at an elevated temperature upon an aqueous dispersion of 1-mercaptobenzothiazole with chromic acid formed from an aqueous solution of a dichromate and an acid. The latter acid may be any acid stronger than 1-mercaptobenzothiazole and capable of precipitating it from an alkaline or basic solution thereof. The 1-mercaptobenzothiazole is preferably formed as a suspension, from an alkaline solution thereof, by adding sufficient acid with the dichromate to freshly precipitate the 1-mercaptobenzothiazole for the purposes of the reaction, or by adding sufficient acid for the purpose of freshly precipitating the 1-mercaptobenzothiazole just prior to adding the aqueous acid dichromate solution. The proportions of acid used with the dichromate are at least 12 equivalents for each 6 moles of the 1-mercaptobenzothiazole to be converted to the disulphide. The proportions of the dichromate used are at least 1.5 moles for every 6 moles of the mercaptobenzothiazole. A sufficiently large amount of water is desirably present at the time of precipitation of the 1-mercaptobenzothiazole so as to minimize the heat of neutralization with the acid. The acid in the dichromate solution performs the further function of liberating chromic acid ($CrO_3$ or $H_2CrO_4$) from the dichromate, which chromic acid is reduced by the 1-mercaptobenzothiazole in acid solution at elevated temperatures, causing the formation of the 1,1'-dithio bis benzothiazole.

The conversion of the 1-mercaptobenzothiazole is carried out at an elevated temperature and with agitation. The temperature may be from about 80° C. to the boiling point of the solution, preferably from about 80° C. to 100° C.

The following examples illustrate the invention:

Example I

A mixture of 100 grams (6 moles) crude 1-mercaptobenzothiazole, 24 grams (6 moles) sodium hydroxide and 1 liter of water was stirred well and filtered. To this solution of the sodium salt of 1-mercapto-benzothiazole, heated in a steam bath to 90–95° C. were slowly added a solution of 45 grams (1.5 moles) $Na_2Cr_2O_7.2H_2O$, 55 c. c. (10 moles) concentrated sulphuric acid and 300 c. c. water with good agitation over a period of about one hour, whereby the 1-mercapto-benzothiazole is precipitated and chromic acid is formed. After all was added the heating and agitation were continued one-half hour more and the solution was cooled, filtered, washed precipitate thoroughly and dried. Evaporation during addition, etc., was controlled by adding water from time to time. 87 grams of 1,1'-dithio bis benzothiazole melting at 155–171° C. were obtained as a light gray colored powder. The product contains practically no free mercapto compound.

Example II

A mixture of 100 grams commercial 1-mercaptobenzothiazole, 24 grams sodium hydroxide and 1 liter water was boiled and filtered hot. The filtrate was acidified by adding gradually 23 ccs. concentrated sulphuric acid in 100 ccs. water with good agitation. The finely divided precipitate was stirred and heated in steam bath at 90°+ C. and a solution of 45 grams

$Na_2Cr_2O_7.2H_2O$ 32 ccs. concentrated sulphuric acid and 300 ccs. water was slowly added over 1½ hours. Heated one hour more with agitation, cooled, filtered off, washed and dried. 88 grams dibenzothiazyl disulfide (1,1'-dithio bis benzothiazole) of light gray color and melting at 154–172° C. were obtained.

Other bases than sodium hydroxide may be used to form the soluble salt of the mercaptobenzothiazole, and soluble dichromates other than that of sodium may be used.

The present invention provides a relatively inexpensive method of making 1,1'-dithio bis arylenethiazoles and with almost 100% yields considering that commercial 1-mercaptobenzothiazole is approximately 91–95% pure. It is to be understood, of course, that the product recovered, may be further purified, if desired.

Having thus described my invention, what I claim and desire to protect by Letters Patent is:

1. A process for producing 1,1' dithio bis arylene thiazole which comprises reacting at an elevated temperature upon an aqueous suspension of a 1-mercapto arylene thiazole with chromic acid.

2. A process of producing 1,1' dithio bis arylene thiazole which comprises precipitating a 1-mercapto arylene thiazole from basic solution of a salt thereof with an acid stronger than the 1-mercapto arylene thiazole and reacting upon the freshly precipitated thiazole with an aqueous solution containing chromic acid.

3. A process for producing 1,1' dithio bis arylene thiazole which comprises reacting at an elevated temperature upon an aqueous finely divided suspension of a 1-mercapto arylene thiazole precipitated by an acid stronger than the 1-mercapto arylene thiazole with an aqueous solution of a dichromate in the presence of an acid stronger than 1-mercapto arylene thiazole.

4. A process of producing 1,1'-dithio bis arylene thiazole which comprises adding an aqueous solution of an alkali metal dichromate and a mineral acid stronger than 1-mercapto arylene thiazole and capable of precipitating it from an alkaline solution thereof, at an elevated temperature to a finely divided aqueous suspension of the 1-mercapto arylene thiazole, and reacting upon the thiazole with chromic acid, with agitation, to form the 1,1'-dithio bis arylene thiazole.

5. A process of producing 1,1'-dithio bis arylene thiazole which comprises reacting at an elevated temperature upon an aqueous finely divided suspension of 1-mercapto arylene thiazole with sodium dichromate in the presence of sulphuric acid.

6. A process of producing 1,1'-dithio bis arylene thiazole which comprises adding with agitation an aqueous solution of sodium dichromate and an acid stronger than 1-mercapto arylene thiazole and capable of precipitating the mercapto arylene thiazole from an aqueous solution of an alkaline salt thereof, to an aqueous solution of an alkaline salt of the mercapto arylene thiazole whereby to precipitate the mercapto arylene thiazole, and while agitating, reacting at an elevated temperature upon the aqueous dispersion of the precipitated mercapto arylene thiazole with chromic acid formed from said dichromate in the presence of a strong acid, whereby to form the 1,1'-dithio bis arylene thiazole in suspension.

7. A process of producing 1,1'-dithio bis benzothiazole which comprises adding an aqueous solution of at least 1½ moles of sodium dichromate and a strong mineral acid to an aqueous suspension of 6 moles of 1-mercapto benzothiazole while agitating at a temperature of about 80° C.–100° C.

8. A process of producing 1,1'-dithio bis benzothiazole which comprises treating a finely divided aqueous suspension of 6 moles of 1-mercaptobenzothiazole with a water solution of at least 1½ moles of sodium dichromate and at least 12 equivalents of a strong acid, with agitation and while maintaining a temperature of about 80–100° C.

WILLIAM E. MESSER.